United States Patent [19]
Yoshifuji

[11] Patent Number: 5,200,746
[45] Date of Patent: Apr. 6, 1993

[54] SWITCHING MODULE FOR DIGITAL CROSS-CONNECT SYSTEMS

[75] Inventor: Yuuki Yoshifuji, Tokyo, Japan
[73] Assignee: NEC Corporation, Tokyo, Japan
[21] Appl. No.: 739,801
[22] Filed: Aug. 5, 1991
[30] Foreign Application Priority Data
  Aug. 6, 1990 [JP] Japan .................................. 2-206875
[51] Int. Cl.$^5$ ............................................. H04Q 1/00
[52] U.S. Cl. ............................ 340/825.8; 340/825.79; 340/826; 370/65.5
[58] Field of Search ............... 340/825.8, 825.79, 826, 340/825.86; 370/63, 65.5, 59, 58.1, 58.2, 58.3, 60, 60.1; 379/271, 291, 292, 306

[56] References Cited
U.S. PATENT DOCUMENTS

| | | | |
|---|---|---|---|
| 3,842,214 | 10/1974 | Altenburger et al. | 340/825.8 |
| 4,074,077 | 2/1978 | Charransol et al. | 370/63 |
| 4,455,645 | 6/1984 | Mijioka et al. | 379/279 |
| 4,536,870 | 8/1985 | Bovo et al. | 370/63 |
| 4,737,659 | 4/1988 | Fognini | 370/58.1 |
| 4,970,505 | 11/1990 | Hirata et al. | 340/825.8 |

Primary Examiner—Donald J. Yusko
Assistant Examiner—Edwin C. Holloway, III
Attorney, Agent, or Firm—Foley & Lardner

[57] ABSTRACT

In a switching module for a digital cross-connect system, N input terminals of the module are divided into first and second groups and N output terminals are likewise divided into first and second groups. First and second N×N space switches and a first group of N selectors are provided. Each of the first-group selectors has a first input coupled to an associated one of the N input terminals of the first group and an output coupled to an associated one of N inputs of the first N×N space switch. A first group of N splitters are connected respectively to the N input terminals of the second group, each of the splitters having a first output coupled to a second input of an associated slector of the first group and a second output coupled to an associated input of the second N×N space switch. A second group of N selectors is provided, each having a first input coupled to an associated output of the first N×N space switch and an output coupled to an associated output terminal of the first group. A second group of N splitters are connected respectively to N outputs of the second N×N space switch. Each of the second group splitters has a first output coupled to a second input of an associated selector of the second group and a second output coupled to an associated output terminal of the second group.

8 Claims, 5 Drawing Sheets

BASIC ARRAY CONFIGURATION

BASIC ARRAY CONFIGURATION

5,200,746

SWITCHING MODULE FOR DIGITAL CROSS-CONNECT SYSTEMS

BACKGROUND OF THE INVENTION

The present invention relates generally to digital switching systems, and more specifically to a switching module for digital cross-connect systems.

In a prior art three-stage nonblocking switching network for digital cross-connect systems, different sizes of switching modules are employed for the different stages of the network. One disadvantage of the prior art is that because of the different switch sizes, three types of switching modules must be provided respectively for the stages. One solution would be to use a basic module having a switch size large enough to accommodate the configuration of any of the stages of the network. However, in some stages of the network the crosspoints are not fully utilized and power is uselessly dissipated by the unused crosspoints.

SUMMARY OF THE INVENTION

It is therefore an object of the present invention to provide a switching module having reduced crosspoints for use as a basic building block of a multi-stage space division switching network.

The switching module of this invention comprises first and second groups of N input terminals and first and second groups of N output terminals. First and second $N \times N$ space switches and a first group of N selectors are provided. Each of the first-group selectors has a first input coupled to an associated one of the N input terminals of the first group and an output coupled to an associated one of N inputs of the first $N \times N$ space switch. A first group of N splitters are connected respectively to the N input terminals of the second group, each of the splitters having a first output coupled to a second input of an associated selector of the first group and a second output coupled to an associated input of the second $N \times N$ space switch. A second group of N selectors is provided, each having a first input coupled to an associated output of the first $N \times N$ space switch and an output coupled to an associated output terminal of the first group. A second group N splitters are connected respectively to N outputs of the second $N \times N$ space switch. Each of the second-group splitters has a first output coupled to a second input of an associated selector of the second group and a second output coupled to an associated output terminal of the second group.

According to a second aspect of this invention, the switching module is used as a basic building block of a three-stage space division switching network by configuring the basic module according to the different stages of the network. The network comprises an inlet stage of N switching modules of $N \times 2N$ configuration, a center stage of 2N switching modules of $N \times N$ configuration, and an outlet stage of N switching modules of $2N \times N$ configuration. N inputs of a first group of the center-stage modules are respectively connected to a first group of N outputs of the inlet-stage modules, and N inputs of a second group of the center-stage modules are respectively connected to a second group of N outputs of the inlet-stage modules. N outputs of the first group of the center-stage modules are respectively connected to a first group of N inputs of the outlet-stage modules, and N outputs of the second group of the center-stage modules are respectively connected to a second group of N inputs of the outlet-stage modules. The basic switching modules for the inlet stage are configured such that each selector of the first group permanently establishes a connection from its second input to its output and each selector of the second group permanently establishes a connection from its first input to its output. The basic switching modules of the center stages are configured so that each selector of the first group permanently establishes a connection from its first input to its output and each selector of the second group permanently establishes a connection from its first input to its output. The basic switching modules of the outlet stage are configured so that each selector of the first group permanently establishes a connection from its first input to its output and each selector of the second group permanently establishes a connection from one of its first and second inputs to its output.

BRIEF DESCRIPTION OF THE DRAWINGS

The present invention will be described in further detail with reference to the accompanying drawings, in which.

DETAILED DESCRIPTION

Figure 1:
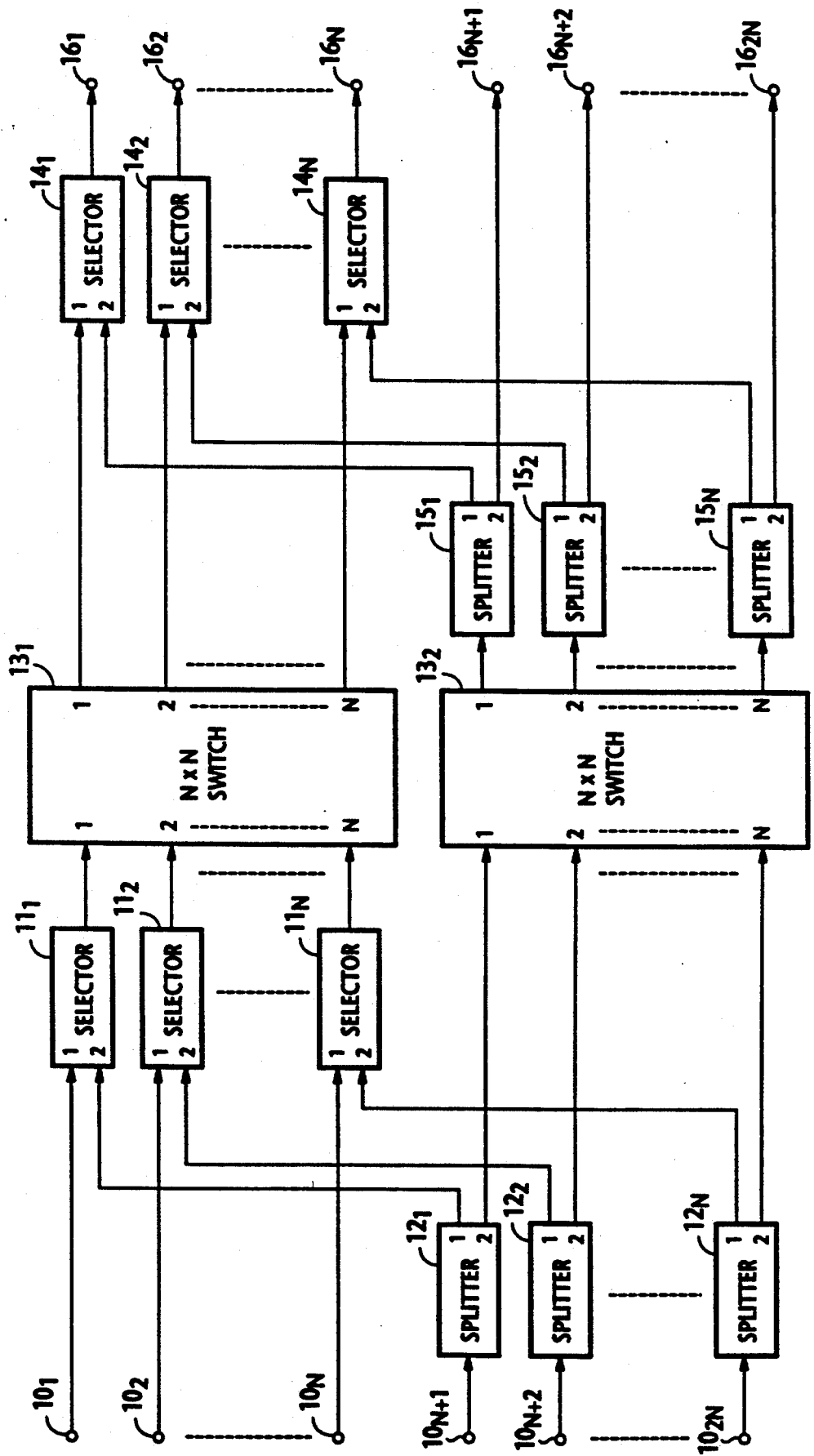
FIG. 1 is a block diagram of a basic switching module according to the present invention.

Referring now to FIG. 1, there is shown a basic switching module according to the present invention. The switching module has 2N input terminals $10_1-10_{2N}$ to which TDM (time-division multiplex) input input signals are applied, and 2N output terminals $16_1-16_{2N}$ from which path-switched TDM output signals are delivered. The switching module comprises two $N \times N$ digital space switches $13_1$ and $13_2$, each having an array of LSI crosspoints which establish connections from any of its N inputs to any of its N outputs on a per time-slot basis in response to control information. During each time slot, each $N \times N$ space switch is accessed by the control information specifying a particular set of crosspoints to establish given connections and during other time slots, the space switch is completely reconfigured to support other connections. On the input side of the $N \times N$ switches, a first set of $2 \times 1$ selectors $11_1 \sim 11_N$ and a corresponding set of $1 \times 2$ splitters $12_1 \sim 12_N$ are provided, and on the output side of the switches, a second set of selectors $14_1 \sim 14_N$ and a corresponding set of splitters $15_1 \sim 15_N$ are provided.

The input terminals $10_1-10_{2N}$ of the module are divided into first and second groups. The input terminals of the first group $10_1-10_N$ are coupled respectively to the first inputs of selectors $11_1-11_N$ and those of the second group $10_{NH}-10_{2N}$ are coupled respectively to the inputs of splitters $12_1 \sim 12_N$. The first outputs of splitters $12_1 \sim 12_N$ are respectively connected to the second inputs of corresponding selectors $11_1-11_N$ whose outputs are connected to respective inputs of switch $13_1$, and the second outputs of splitters $12_1-12_N$ are connected to respective inputs of space switch $13_2$.

In like manner, the output ports of space switch $13_1$ are connected to the first input of selectors $14_1 \sim 14_N$, respectively, and the outputs of space switch $13_2$ are connected to the inputs of splitters $15_1 \sim 15_N$, respectively. The first outputs of splitters $15_1 \sim 15_N$ are connected to the second inputs of corresponding selectors $14_1 \sim 14_N$ whose outputs are connected respectively to the output terminals $16_1 \sim 16_N$ of the module. The second outputs of splitters $15_1 \sim 15_N$ are respectively connected to the output terminals $16_{N+1} \sim 16_{2N}$ of the module.

It is seen that each splitter $12_i$ establishes two connections from the associated input terminal $10_{N+i}$, one to space switch $13_1$ via selector $11_i$ and the other to space switch $13_2$, and that each splitter $15_i$ establishes two connections, one to output terminal $16_i$ via selector $14_i$ and the other to output terminal $16_{N-i}$.

Figure 2:
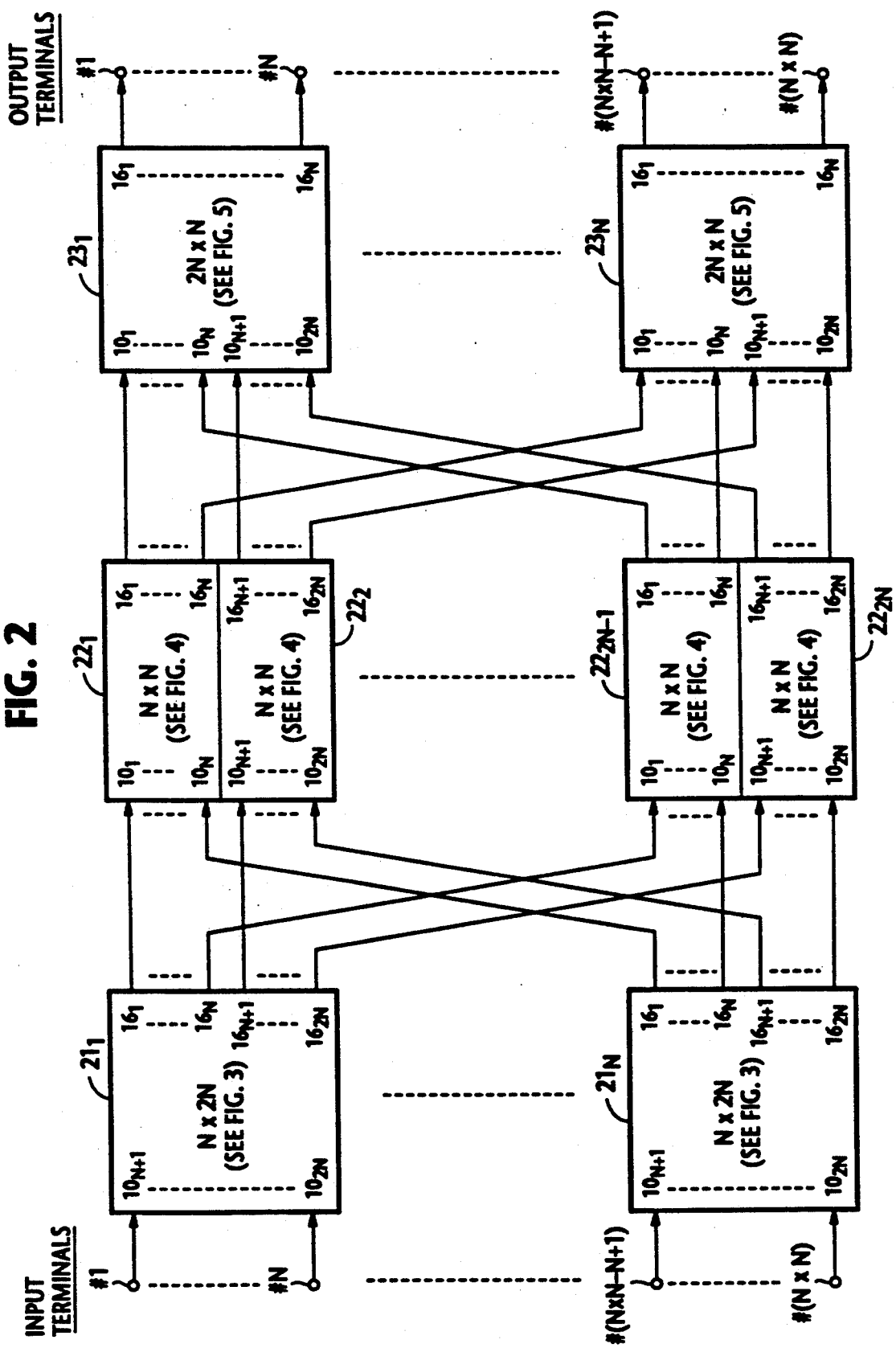
FIG. 2 is a block diagram of a three-stage cross-connect system incorporating the switching module of FIG. 1.

As shown in FIG. 2, the basic switching module can be permanently configured into either of the individual stages of an $(N \times N) \times (N \times N)$, nonblocking three-stage space division switching network for a digital cross-connect system. In this network, the inlet stage comprises N arrays of $(N \times 2N)$ switching modules $21_1 \sim 21_N$, the center stage comprising 2N arrays of $(N \times N)$ switching modules $22_1 \sim 22_{2N}$, and the outlet stage comprising N arrays of $(2N \times N)$ switching modules $23_1 - 23_N$. It is seen that the same number of basic modules are used in each stage of the network.

More specifically, the outputs $16_1 \sim 16_N$ of inlet-stage module $21_1$, are respectively connected to the inputs $10_1 \sim 10_1$ of odd-numbered center-stage modules $22_1 - 22_{2N-1}$ and the outputs $16_{N+1} \sim 16_{2N}$ of inlet-stage module $21_1$ are respectively connected to the inputs $10_{N+1} \sim 10_{N+1}$ of even-numbered center-stage modules $22_2 \sim 22_{2N}$. In a similar manner, the outputs $16_1 - 16_N$ of inlet-stage module $21_N$ are respectively connected to the inputs $10_N - 10_N$ of odd-numbered center-stage modules $22_1 - 22_{2N-1}$ and the outputs $16_{N+1} - 16_{2N}$ of inlet-stage module $21_N$ are respectively connected to the inputs $10_{2N} - 10_{2N}$ of even-numbered center-stage modules $22_2 - 22_{2N}$.

The outputs $16_1 \sim 16_N$ of center-stage module $22_1$ are respectively connected to the inputs $10_1 \sim 10_1$ of outlet-stage modules $23_1 \sim 23_N$ and the outputs $16_{N+1} - 16_{2N}$ of center-stage module $22_2$ are respectively connected to the inputs $10_{N+1} - 10_{N+1}$ of outlet-stage modules $23_1 \sim 23_N$. The outputs $16_1 \sim 16_N$ of center-stage module $22_{2N-1}$ are respectively connected to the inputs $10_N \sim 10_N$ of outlet-stage modules $23_1 \sim 23_N$ and the outputs $16_{N+1} \sim 16_{2N}$ of center-stage module $22_{2N}$ are respectively connected to the inputs $10_{2N} - 10_{2N}$ of outlet-stage modules $23_1 - 23_N$. A signal at applied to any of input terminals #1 through $\#(N \times N)$ of the switching network will find a path to any of output terminals #1 through $\#(N \times N)$ of the network.

Figure 3:
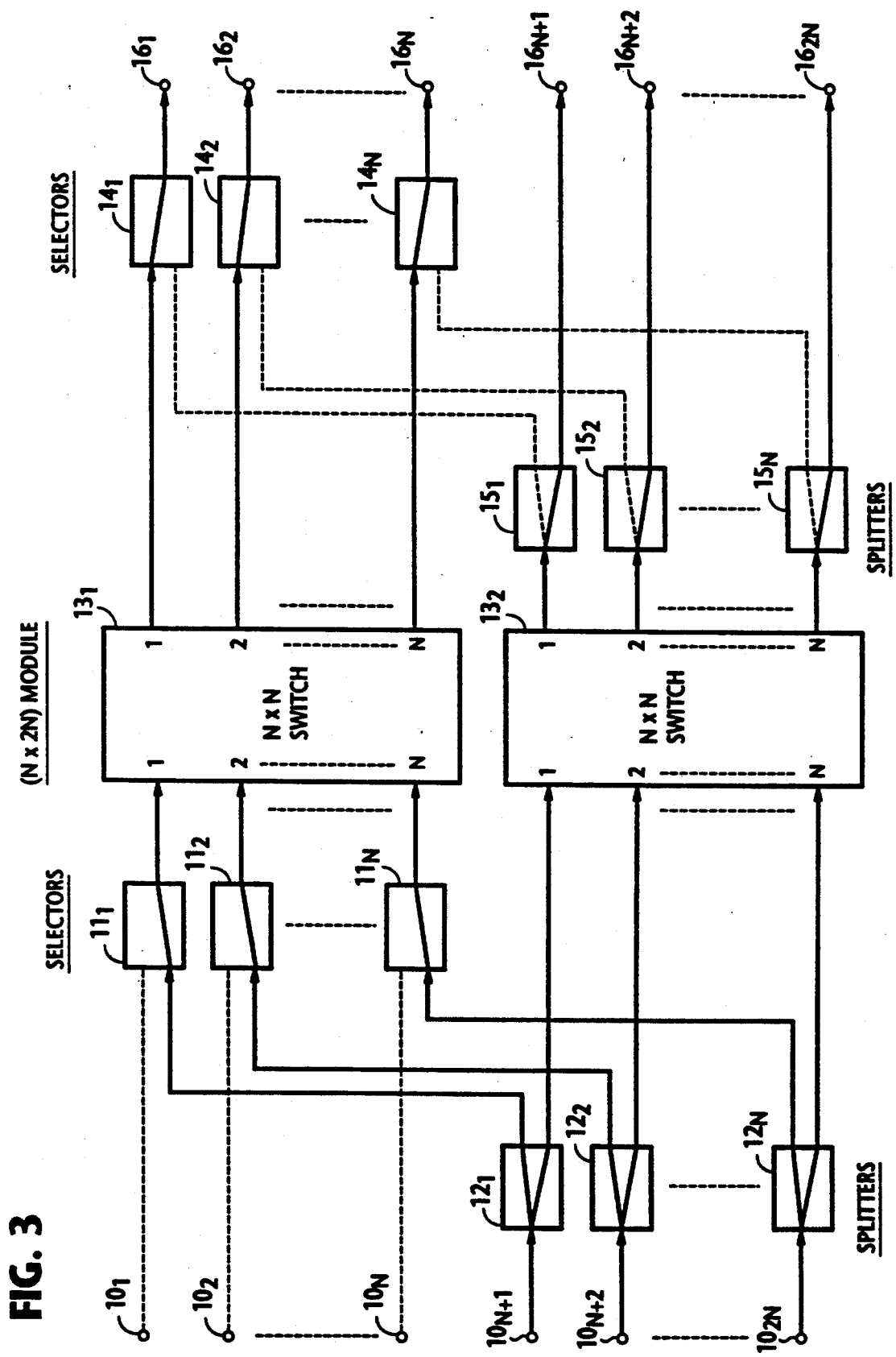
FIG. 3 is a block diagram of each module of the inlet stage of the cross-connect system.

As illustrated in FIG. 3, each inlet-stage $(N \times 2N)$ switching module 21 is formed by controlling the selectors $11_1 - 11_N$ of the basic module so that they permanently connect their second input to their output and by controlling the selectors $14_1 \sim 14_N$ of the basic module so that they permanently connect their first input to their output. In this way, the TDM input signals applied to terminals $10_{N+1} \sim 10_{2N}$ of the basic module find a first path through the first outputs of splitters 12 and corresponding selectors 11 to space switch $13_1$ in which their paths are switched according to routing information, and go through selectors 14 to output terminals $16_1 - 16_N$. The same TDM inputs find a second path through the second outputs of splitters 12 to space switch $13_2$ in which their paths are switched according to routing information, and go through splitters 15 to output terminals $16_{N+1} \sim 16_{2N}$. Therefore, a connection can be established from any of N input terminals $10_{N+1} \sim 10_{2N}$ to any of 2N output terminals $16_1 \sim 16_{2N}$.

Figure 4:
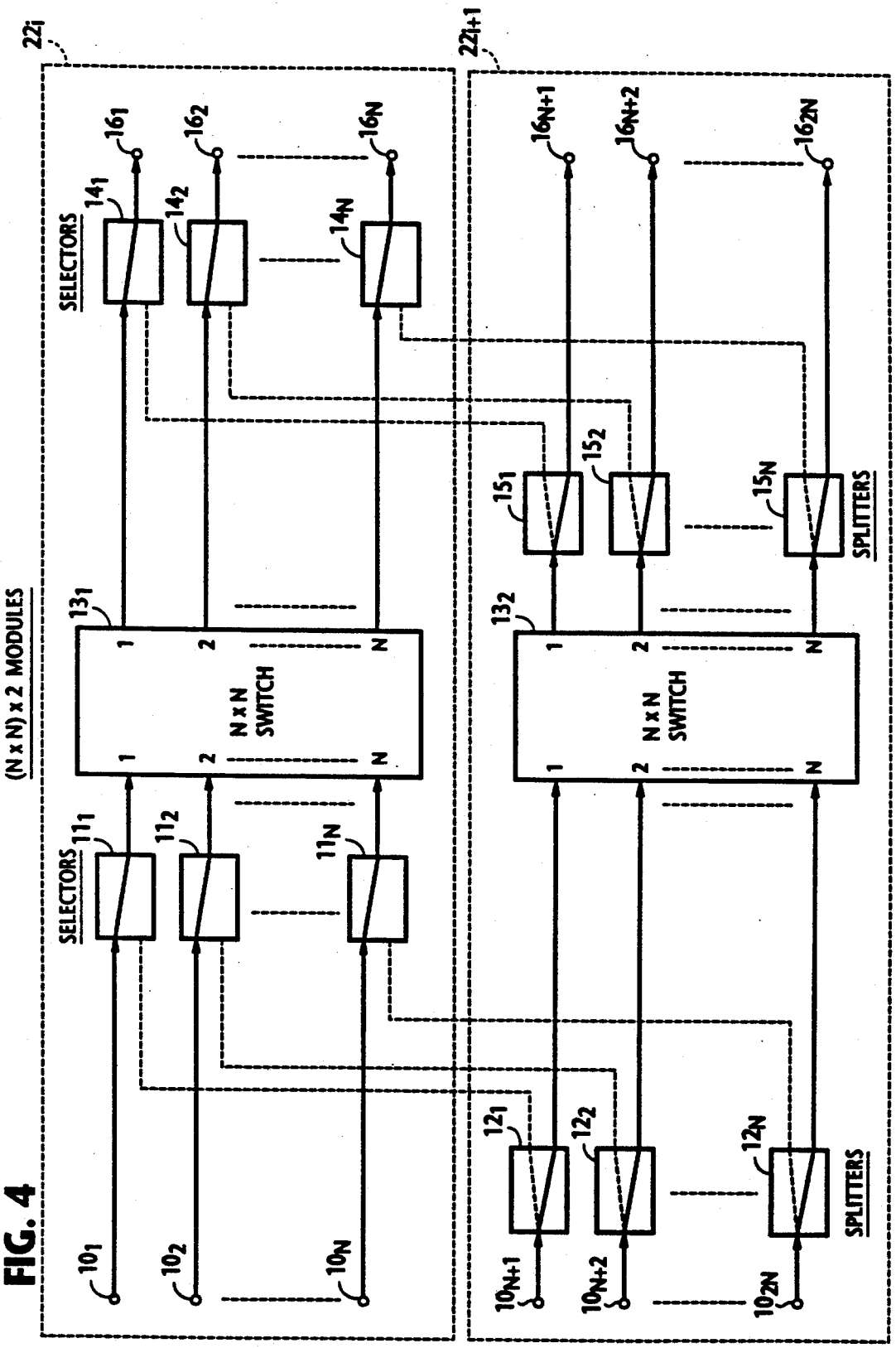
FIG. 4 is a block diagram of each module of the center stage of the cross-connect system.

FIG. 4 shows details of each center-stage switching module. As illustrated, each center-stage $N \times N$ switching array is formed by independent subdivisions $22_i$ and $22_{i+1}$ of the basic module. This is achieved by controlling the selectors $11_1 \sim 11_N$ of the basic module so that they permanently connect their first input to their output and by controlling the selectors $14_1 - 14_N$ of the basic module so that they permanently connect their first input to their output. In this way, the TDM inputs applied to terminals $10_1 \sim 10_N$ of the basic module find a path through selectors 11 to space switch $13_1$ in which their paths are switched, and go through selectors 14 to output terminals $16_1 \sim 14_N$. the TDM inputs applied to input terminals $10_{N+1} \sim 10_{2N}$ find a path through splitters 12 to space switch $13_2$ in which their paths are switched, and go through splitters 15 to output terminals $16_{N+1} - 16_{2N}$. Therefore, a connection is established in the submodule 30 from any of N input terminals $10_1 - 10_N$ to any of N output terminals $16_1 - 16_N$ and a connection is established in the submodule 31 from any of N input terminals $10_{N+1} - 10_{2N}$ to any of N output terminals $16_{N+1} - 16_{2N}$.

Figure 5:
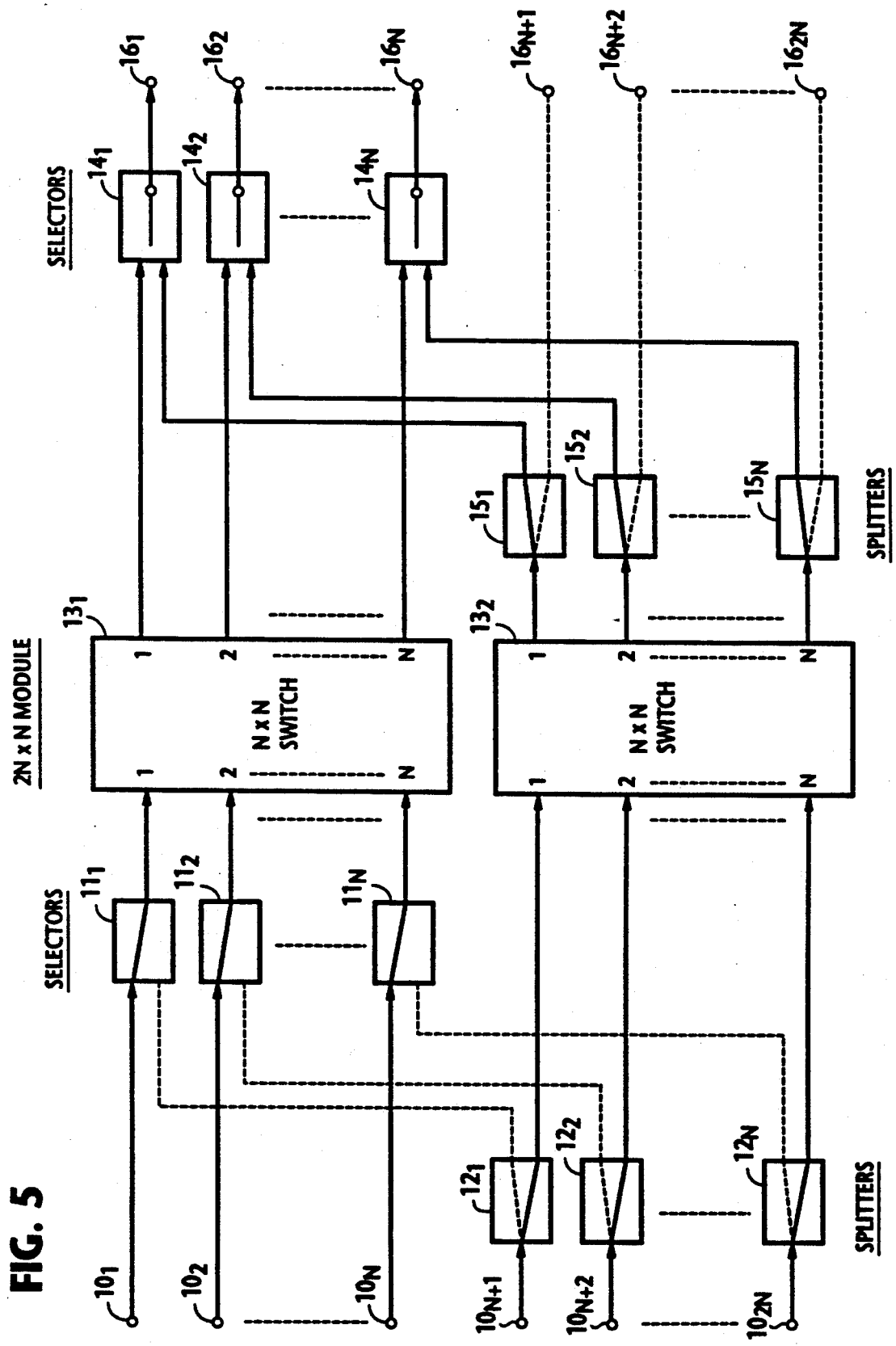
FIG. 5 is a block diagram of each module of the outlet stage of the cross-connect system.

In FIG. 5 each outlet-stage $(2N \times N)$ switching module 23 is formed by controlling selectors $11_1 \sim 11_N$ to connect their first input to their output and by controlling selectors $14_1 \sim 14_N$ to connect either of their first and second inputs to their output depending on traffic needs. In this configuration, the connections from the second outputs of splitters 15 to output terminals $16_{N+1} \sim 16_{2N}$ are left unused. The TDM inputs applied to terminals $10_1 \sim 10_N$ find a path through selectors 11 to space switch $13_1$, and go on to find a path through selectors 14 to output terminals $16_1 - 16_N$ and the TDM inputs applied to terminals $10_{N+1} - 10_{2N}$ find a path through splitters 12 to space switch $13_2$, and go on to find a path through splitters 15 and selectors 14 to output terminals $16_1 \sim 16_N$. Therefore, a connection can be established from any of 2N input terminals $10_1 \sim 10_{2N}$ to any of the N output terminals $16_1 \sim 16_N$.

What is claimed is:

1. A switching module comprising:
    first and second groups of N input terminals, and first and second groups of N output terminals;
    first and second $N \times N$ space switches;
    a first group of N selectors each having a first input coupled to an associated one of the input terminals of the first group and an output coupled to an associated one of N inputs of the first $N \times N$ space switch;
    a first group of N splitters connected respectively to the input terminals of the second group, each of the splitters having a first output coupled to a second input of an associated one of the selectors of the first group and a second output coupled to an associated one of N inputs of the second $N \times N$ space switch;
    a second group of N selectors each having a first input coupled to an associated one of N outputs of the first $N \times N$ space switch and an output coupled to an associated one of the output terminals of the first group; and
    a second group of N splitters connected respectively to N outputs of the second $N \times N$ space switch, each of the splitters having a first output coupled to a second input of an associated one of the selectors of the second group and a second output coupled to an associated one of the output terminals of the second group.

2. A switching module as claimed in claim 1, wherein each of the selectors of the first group permanently establishes a connection from the second input thereof to the output thereof and each of the selectors of the second group permanently establishes a connection from the first input thereof to the output thereof to form an inlet-stage switch of a three-stage switching network.

3. A switching module as claimed in claim 1, wherein each of the selectors of the first group permanently establishes a connection from the first input thereof to the output thereof and each of the selectors of the second group permanently establishes a connection from the first input thereof to the output thereof to form center-stage switches of a three-stage switching network.

4. A switching module as claimed in claim 1, wherein each of the selectors of the first group permanently establishes a connection from the first input thereof to the output thereof and each of the selectors of the second group permanently establishes a connection from one of the first and second inputs thereof to the output thereof to form an outlet-stage switch of a three-stage switching network.

5. A switching module as claimed in claim 1, wherein said first and second groups of N input terminals receive time-division multiples signals and wherein each of the $N \times N$ space switches is a digital space switch for establishing a unique connection between N input and N outputs of the switch during each time slot of said time-division multiplex signals.

6. A space-division switching network comprising:
an inlet stage having N switching modules of $N \times 2N$ configuration;
a center stage having 2N switching modules of $N \times N$ configuration;
an outlet stage having N switching modules of $2N \times N$ configuration;
first connecting means for connecting N inputs of a first group of the center-stage modules respectively to a first group of N outputs of the inlet-stage modules, and connecting N inputs of a second group of the center-stage modules respectively to a second group of N outputs of the inlet-stage modules;
second connecting means for connecting N outputs of the first group of the center-stage modules respectively to a first group of N inputs of the outlet-stage modules, and connecting N outputs of the second group of the center-stage modules respectively to a second group of N inputs of the outlet-stage modules;
each module of said inlet, center and outlet stages comprising:
first and second groups of N input terminals, and first and second groups of N output terminals;
first and second $N \times N$ space switches;

a first group of N selectors each having a first input coupled to an associated one of the input terminals of the first group and an output coupled to an associated one of N inputs of the first $N \times N$ space switch;
a first group of N splitters connected respectively to the input terminals of the second group, each of the splitters having a first output coupled to a second input of an associated one of the selectors of the first group and a second output coupled to an associated one of N inputs of the second $N \times N$ space switch;
a second group of N selectors each having a first input coupled to an associated one of N outputs of the first $N \times N$ space switch and an output coupled to an associated one of the output terminals of the first group; and
a second group of N splitters connected respectively to N outputs of the second $N \times N$ space switch, each of the splitters having a first output coupled to a second input of an associated one of the selectors of the second group and a second output coupled to an associated one of the output terminals of the second group,
wherein each selector of the first group of each inlet-stage module permanently establishes a connection from the second input thereof to the output thereof and each selector of the second group of each inlet-stage module permanently establishes a connection from the first input thereof to the output thereof, and each selector of the first group of each center-stage module permanently establishes a connection from the first input thereof to the output thereof and each selector of the second group of each center-stage module permanently establishes a connection from the first input thereof to the output thereof, and each selector of the first group of each outlet-stage module permanently establishes a connection from the first input thereof to the output thereof and each selector of the second group of each outlet-stage module permanently establishes a connection from one of the first and second inputs thereof to the output thereof.

7. A space-division switching network as claimed in claim 6, wherein said first connecting means connects N inputs of (2i−1)th center-stage module respectively to i-th outputs of the inlet-stage modules, where i is between 1 and N, and connects N inputs of 2ith center stage module respectively to (i+N)th outputs of the inlet-stage modules, and wherein said second connecting means connects N outputs of (2i−1)th center-stage module respectively to i-th inputs of the outlet-stage modules, and connects N outputs of 2ith center-stage module respectively to (i+N)th inputs of the outlet-stage modules.

8. A space switching network as claimed in claim 6, wherein said first and second groups of N input terminals receive time division multiplex signals and wherein each of said $N \times N$ space switches is a digital space switch for establishing a unique connection between N inputs and N outputs of the switch during each time slot of said time-division multiplex signals.

* * * * *